US007299465B2

(12) United States Patent
Braun et al.

(10) Patent No.: US 7,299,465 B2
(45) Date of Patent: Nov. 20, 2007

(54) CONFIGURABLE APPLICATION INTEGRATING SERVICE REQUEST AND FULFILLMENT PROCESS

(75) Inventors: Timothy L. Braun, Susquehanna, PA (US); Beverly M. Fassett, Binghamton, NY (US); Peter J. Yablonsky, Apalachin, NY (US)

(73) Assignee: International Business Machines Corporation, Armonk, NY (US)

( * ) Notice: Subject to any disclaimer, the term of this patent is extended or adjusted under 35 U.S.C. 154(b) by 731 days.

(21) Appl. No.: 10/041,394

(22) Filed: Jan. 8, 2002

(65) Prior Publication Data

US 2003/0131040 A1 Jul. 10, 2003

(51) Int. Cl.
G06F 9/46 (2006.01)
G06F 7/00 (2006.01)
G06F 15/00 (2006.01)
G06F 3/00 (2006.01)
G06F 15/16 (2006.01)

(52) U.S. Cl. .................. 718/100; 718/102; 718/104; 718/105; 705/8; 705/9; 715/505; 715/508; 715/512; 715/764; 707/100; 707/102; 709/201

(58) Field of Classification Search ........ 718/100–108; 705/8–9, 26, 3; 714/15; 709/201–203; 707/8, 202, 100, 102; 710/200; 715/512, 715/764
See application file for complete search history.

(56) References Cited

U.S. PATENT DOCUMENTS

| 4,799,156 | A | * | 1/1989 | Shavit et al. ................. 705/26 |
| 5,301,320 | A | * | 4/1994 | McAtee et al. ................ 705/9 |
| 5,581,691 | A | * | 12/1996 | Hsu et al. .................... 714/15 |
| 5,710,918 | A | | 1/1998 | Lagarde et al. ............. 395/610 |
| 5,745,687 | A | * | 4/1998 | Randell ....................... 709/201 |
| 5,745,754 | A | | 4/1998 | Lagarde et al. ............. 395/615 |

(Continued)

FOREIGN PATENT DOCUMENTS

EP 0 747 841 A1 12/1996

(Continued)

OTHER PUBLICATIONS

Bryden, G.D., et al. "Integration of GroupWare with Project Management via Facilitated Work Sections," IBM Technical Disclosure Bulletin, 39(3):171-173 (Mar. 1996).

(Continued)

*Primary Examiner*—Meng-Al T. An
*Assistant Examiner*—Jennifer N. To
(74) *Attorney, Agent, or Firm*—Scully, Scott, Murphy & Presser, P.C.; John R. Pivnichny, Esq.

(57) ABSTRACT

A method and system for generating a plurality of concurrent solutions for a corresponding plurality of service requests each having one or more service types. The method comprises the steps of defining a set of said service types and a sequence of activities for each said service type; and for each said service request, configuring a workflow of said activities from said service types in each said service request. The method comprises the further steps of defining owners of said activities in each said workflow and a schedule for performing said activities whereby said owner and schedule are defined using load balancing; and performing said activities and monitoring completion of said activities and said load balancing.

3 Claims, 10 Drawing Sheets

U.S. PATENT DOCUMENTS

| | | | |
|---|---|---|---|
| 5,752,246 A | 5/1998 | Rogers et al. | 707/10 |
| 5,761,663 A | 6/1998 | Lagarde et al. | 707/10 |
| 5,765,038 A | 6/1998 | Flannery et al. | 395/610 |
| 5,790,847 A | 8/1998 | Fisk et al. | 395/604 |
| 5,828,847 A | 10/1998 | Gehr et al. | 395/200.69 |
| 5,937,388 A * | 8/1999 | Davis et al. | 705/8 |
| 5,974,389 A * | 10/1999 | Clark et al. | 705/3 |
| 6,014,673 A * | 1/2000 | Davis et al. | 707/202 |
| 6,052,684 A * | 4/2000 | Du | 707/8 |
| 6,055,574 A | 4/2000 | Smorodinsky et al. | 709/226 |
| 6,073,109 A * | 6/2000 | Flores et al. | 705/8 |
| 6,078,982 A * | 6/2000 | Du et al. | 710/200 |
| 6,141,759 A | 10/2000 | Braddy | 713/201 |
| 6,157,934 A * | 12/2000 | Khan et al. | 715/503 |
| 6,308,163 B1 * | 10/2001 | Du et al. | 705/8 |
| 6,578,006 B1 * | 6/2003 | Saito et al. | 705/9 |
| 6,678,714 B1 * | 1/2004 | Olapurath et al. | 718/104 |
| 6,874,008 B1 * | 3/2005 | Eason et al. | 709/201 |
| 2003/0023675 A1 * | 1/2003 | Ouchi et al. | 709/203 |

FOREIGN PATENT DOCUMENTS

| | | |
|---|---|---|
| WO | WO 98/16893 | 4/1998 |

OTHER PUBLICATIONS

"System for Supporting the Engagement and Technology Based Training Projects," Research Disclosure, 1850-1851 (Oct. 2000).

* cited by examiner

A METHOD OF GENERATING A PLURALITY OF CONCURRENT SOLUTIONS
FOR A CORRESPONDING PLURALITY OF SERVICE REQUESTS

FIG. 1

FIG. 2     SRM - BUSINESS OVERVIEW

WORKFLOW EXAMPLE:
NEW CPU DEPLOYMENT

FIG. 5

WORKLOAD MANAGEMENT EXAMPLE:
NEW CPU DEPLOYMENT

CONFIGURABLE APPLICATION INTEGRATING SERVICE REQUEST AND FULFILLMENT PROCESS

BACKGROUND OF THE INVENTION

1. Field of the Invention

This invention generally relates to managing base processes and functions associated with a service request and fulfillment process. More specifically, the invention relates to a configurable application for managing such processes and functions in a fully integrated and automated manner.

2. Prior Art

Typically, tools and systems are available only for the discrete work functions associated with performing fulfillment tasks of a service request. These discrete processes and tools require significant manual intervention and/or customized programming to link the processes/tools in the quest to achieve increased productivity. However, problems such as process/tool compatibility, real-time interfacing, and multiple user-interfaces burden the streaming of the overall process, and hence, the productivity gain.

Current solutions for addressing this problem address only pieces of a full solution. Significant manual intervention is required to link the processes together. Even then, consistent reporting among the various processes is still not available.

SUMMARY OF THE INVENTION

An object of this invention is to provide a solution that fully integrates, and hence automates, the base processes and functions associated with a service request and fulfillment process.

Another object of the present invention is to provide a method and system that integrates planned and non-planned services, specific service requests, workflow, fulfillment planning and tracking, and measurements reporting.

A further object of the invention is to provide a fully configurable application for managing base processes and functions associated with a service request and fulfillment process, so that end-to-end processes and internal processes can be tailored to the desired cumulative result.

These and other objectives are attained with a method and system for generating a plurality of concurrent solutions for a corresponding plurality of service requests each having one or more service types. The method comprises the steps of defining a set of said service types and a sequence of activities for each said service type; and for each said service request, configuring a workflow of said activities from said service types in each said service request. The method comprises the further steps of defining owners of said activities in each said workflow and a schedule for performing said activities whereby said owner and schedule are defined using load balancing; and performing said activities and monitoring completion of said activities and said load balancing.

The preferred embodiment of the invention, as described below in detail, eliminates the problems associated with manually piecing together tools and processes. It offers seamless integration and automation of all process steps while providing real-time tracking and information access capability. By leveraging, for example, a lotus Notes Domino infrastructure, all features and advantages of an enterprise groupware system, such as security, scalability, mobility, internet access, database replication, database conflict resolution, personalized private views, etc., apply.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
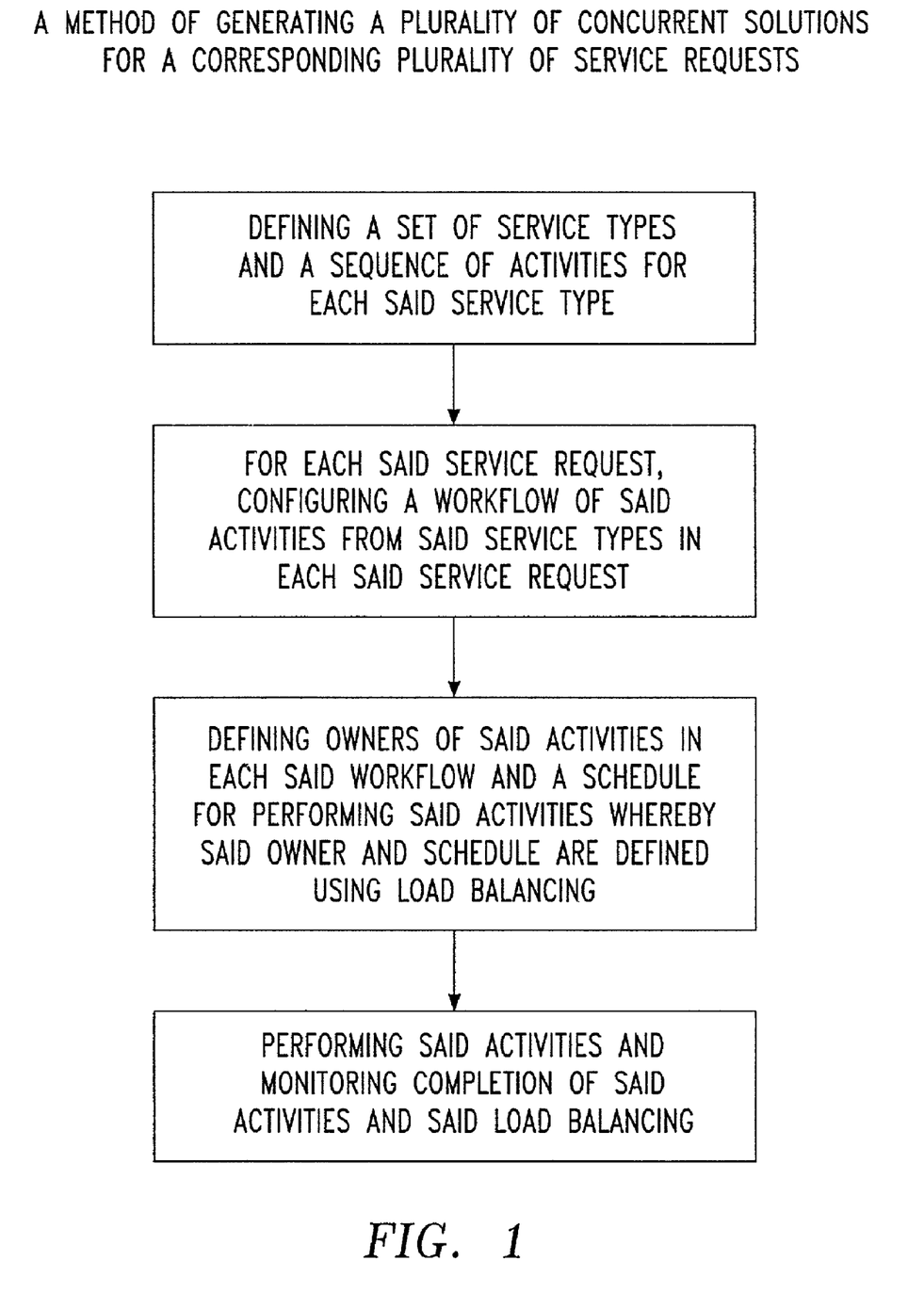
FIG. 1 outlines a preferred method embodying the present invention.

With reference to FIG. 1, the present invention, generally, relates to a method and system for generating a plurality of concurrent solutions for a corresponding plurality of service requests each having one or more service types. The method comprises the steps of defining a set of said service types and a sequence of activities for each said service type; and for each said service request, configuring a workflow of said activities from said service types in each said service request. The method comprises the further steps of defining owners of said activities in each said workflow and a schedule for performing said activities whereby said owner and schedule are defined using load balancing; and performing said activities and monitoring completion of said activities and said load balancing.

Figure 2:
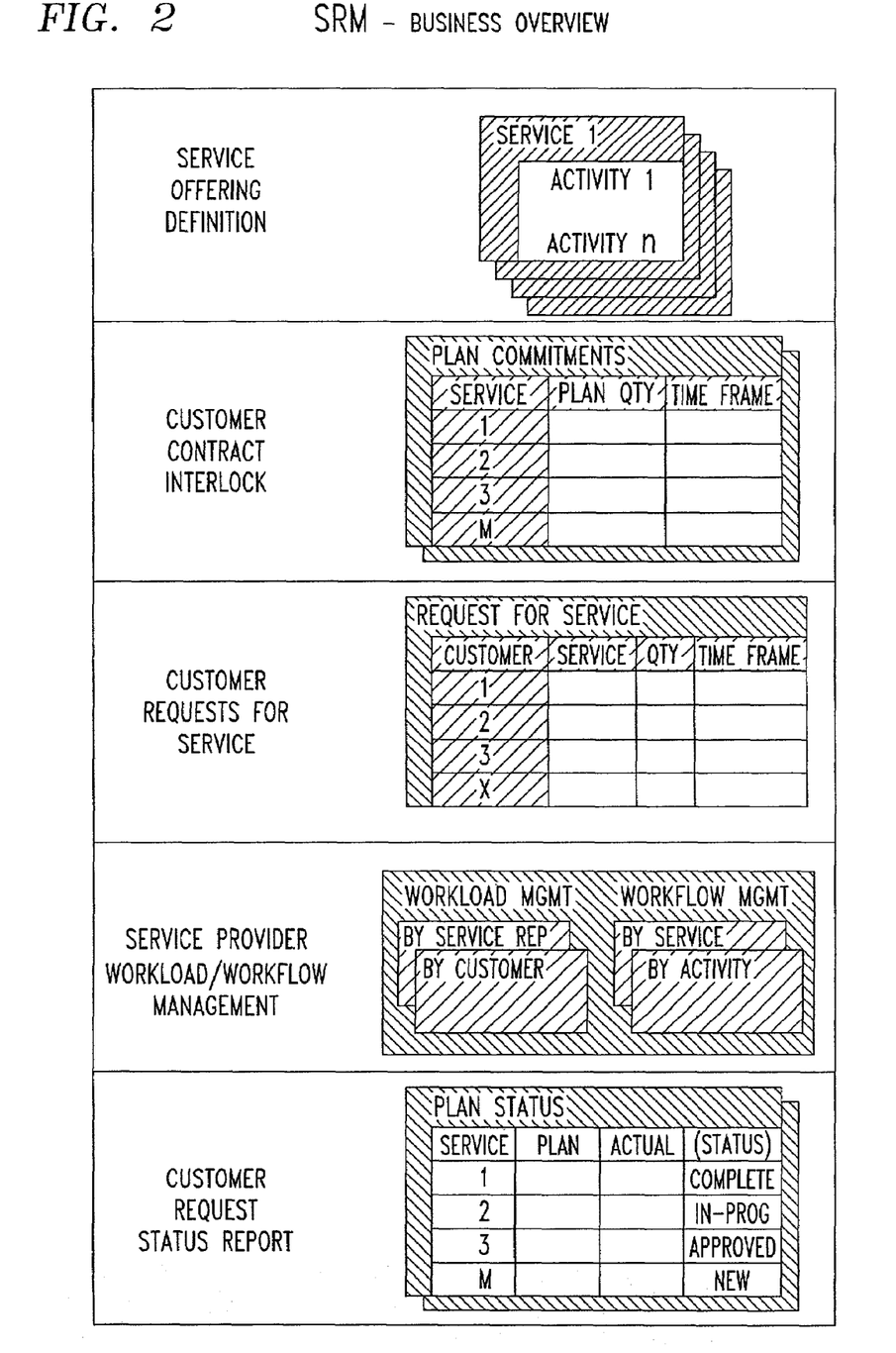
FIG. 2 illustrates a service request manager that may be used in the practice of this invention.

FIG. 2 shows a technical overview of a service request manager (SRM) with which this invention may be used. Generally, the SRM provides several major functions, including service offering definition, customer contract interlock, customer requests for service, service provider workload/workflow management, and customer request status report.

The present invention has been developed and implemented for improving service delivery efficiency associated with workstation environment management. Historically, use of individual processes and tools require additional administrative effort and resources to perform the processes and merge information between processes. This mode of operation heavily relied on the combined skill levels of the participants to create a smooth-running, end-to-end process. Often, changes to planned events or additional requirements created problems within and between the discrete processes. The present invention provides a single user interface, configurable workflows, and automated real-time tracking capabilities to eliminate process overhead and inaccuracies, while increasing information access through a standard environment.

Figure 3:
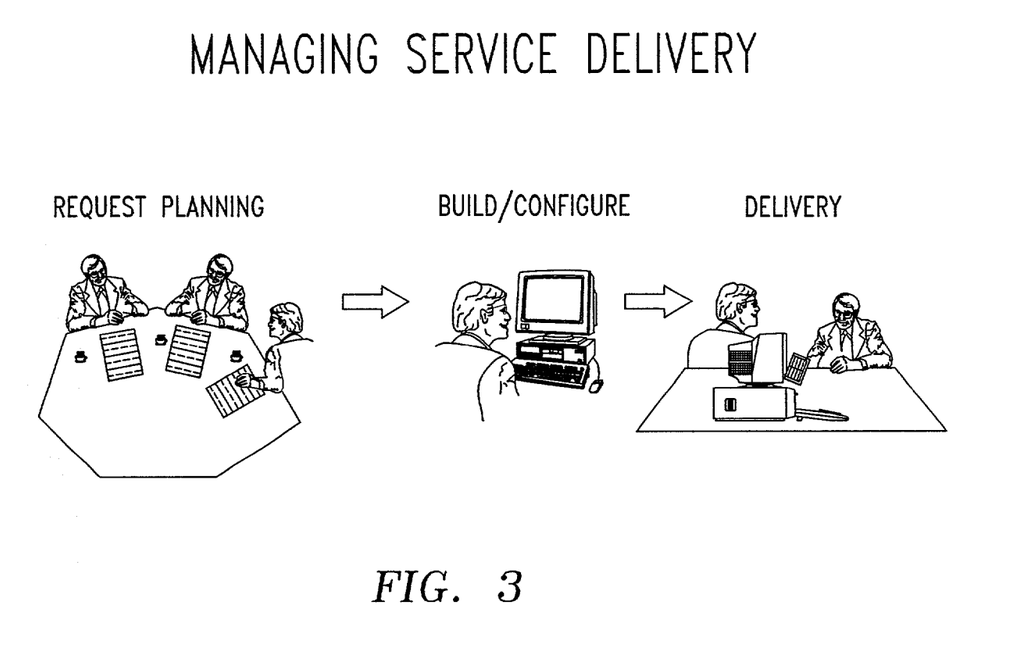
FIGS. 3-5 generally illustrate a workflow pattern employed in the present invention.
Figure 4:
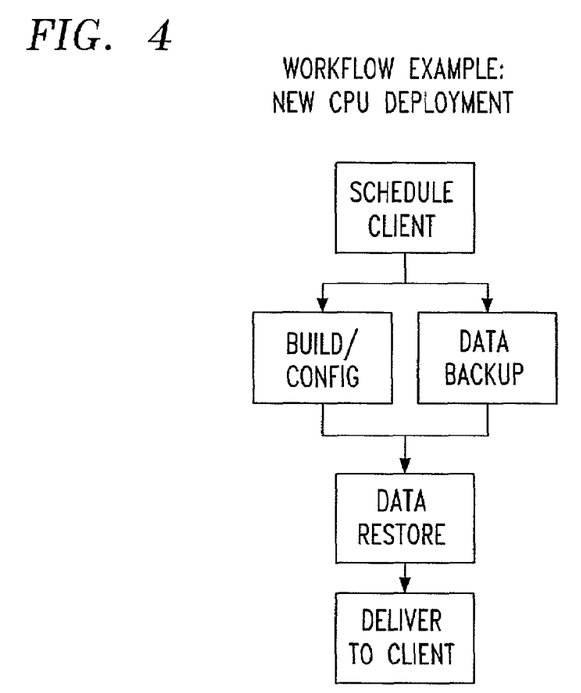
Figure 5:
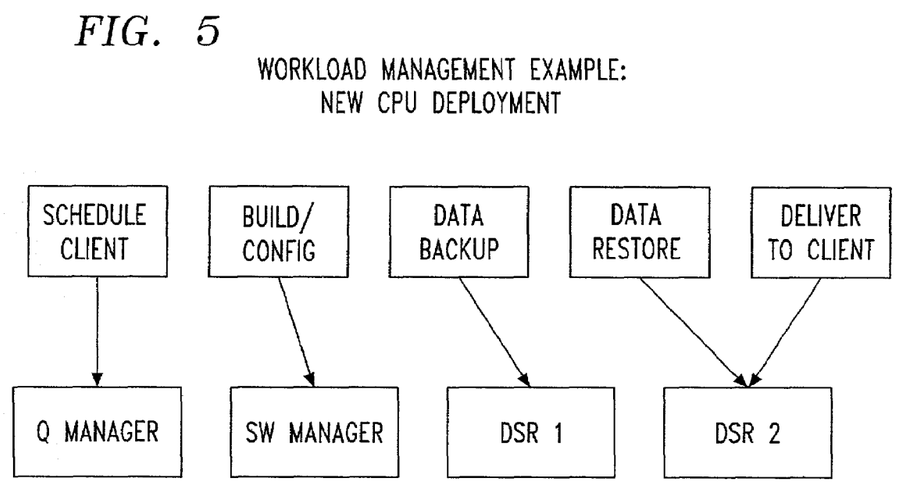

Preferably, with reference to FIG. 3, the preferred implementation of the invention involves request planning, building/configuring a solution, and delivering that solution. FIG. 4 provides an example of a workflow that may occur in the course of the invention. In this workflow, a client is scheduled, a solution is built/configured, with data back-up, data is restored, and the solution is delivered to the client. FIG. 5 provides an example of how this workload may be distributed. The client scheduling could be done by a Queue Manager, the building/configuring of the solution could be done by the another manager, the data back-up could be performed by one person, and the data restore and delivery to the client could be done by another person.

In the preferred implementation of the invention, a database, referred to as the service requirement manager database, is used. The database could be, for example, a lotus Notes database that is used by the service delivery teams to track plans, requests, and delivery activities for their services.

Using the database, the various teams can: Create plans for services for a customer; Create Service Requests for clients; Prioritize the requests; Assign deployment personnel to perform the delivery activities; Quickly determine which clients must be scheduled for service delivery; Balance daily workloads; Track the delivery activities; View personal work "to-do" for each delivery team member; Assist the deployment team members in the weekly claiming of billing hours to the customer; View the plans vs. actuals; and View the status of plans, requests, and activities.

Figure 6:
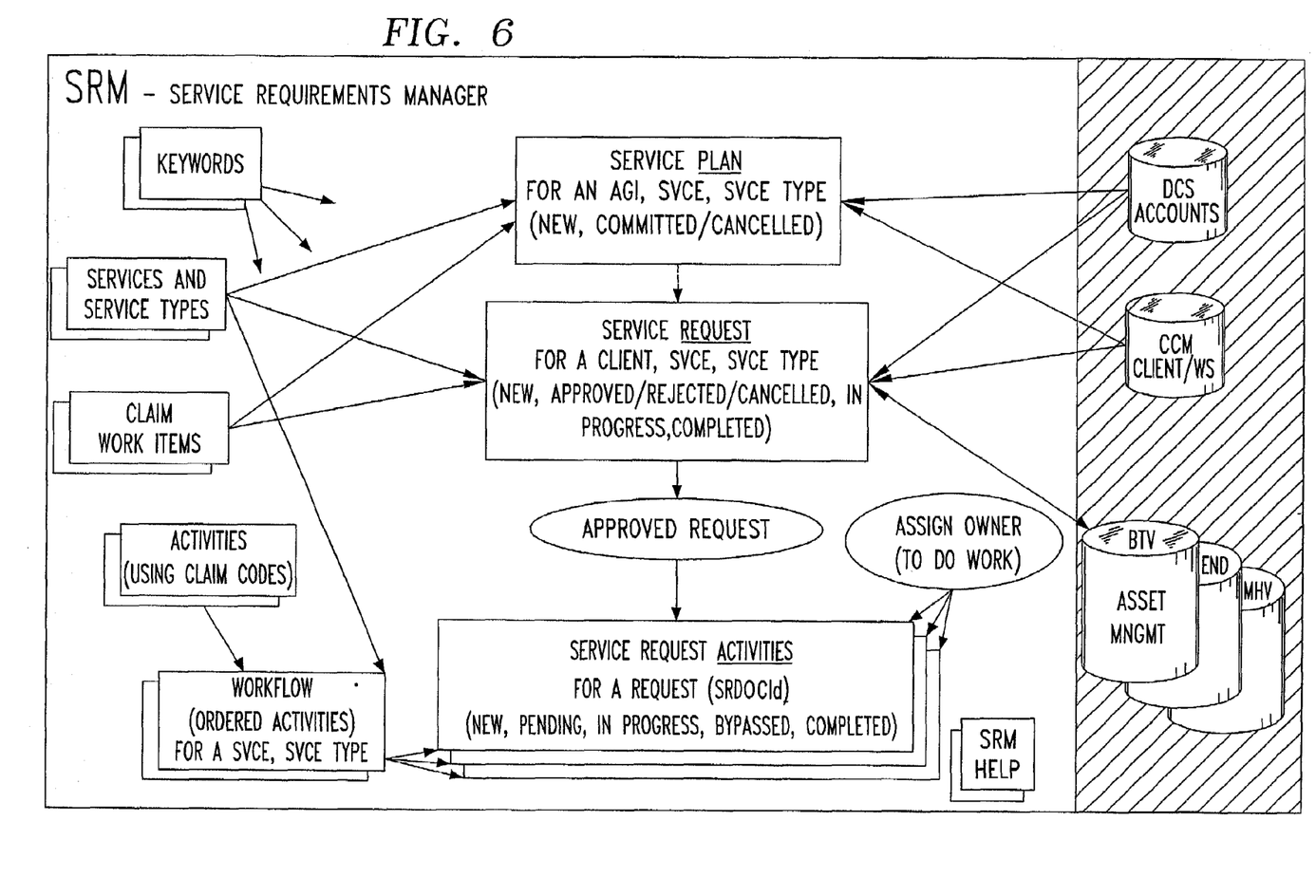
FIG. 6 illustrates components, and their relationships, of the service requirements manager of FIG. 2.

With reference to FIG. 6, The SRM has several main components referred to as "plans," "service requests," "delivery activities," "measurements," and "user definable keywords, rules and tables." A "plan" identifies, for each business area (identified by an account group id), the total number of people that are planned to receive a specific type of service from the service delivery team during the plan year. (These are services such as a new workstation, or a software upgrade.) Plans are made for each specific Account Group Id and Service Type. A "service request" is a request for a specific service for a specific client.

"Delivery activities" are the activities necessary to deliver a service (such as "schedule the client," and "customize software," etc.). Each activity is assigned an owner name (someone on the delivery team) to perform the activity. Each activity has a status that is used to track the progress of the activity. "Measurements" are views as requested by the customer. These include, for example, Plans vs. Requests, Delivery team utilization, and workload analysis. "User definable keywords, rules and tables" include flexible data that can be created and updated at any time by the customer. These include, for instance, field keywords, services, activities, and work flows.

The SRM includes a number of processes. These include (1) Services, activities, and work flow are defined; (2) Plans are created for services; (3) Requests are made for services; (4) Service request activities are performed; and (5) Progress is monitored using the various views. These processes are discussed below.

Services, Activities, and Work Flows are Defined

As new services are needed, various services and related matters are defined. In particular the DCS services, the activities required to deliver those services, any additional information that needs to be collected for the services or activities, and the sequence of the activities to be performed are all defined. In this implementation, the services are defined using the "Service Definition" form. The activities are defined using the "Activity Definition" form. The work items are defined using the "Work Item Definition" form. The workflow activities and their sequences are defined using the "Workflow Activity Definition" form.

Plans are Created for Services

Customer representatives create plans for services by creating Plan documents. Although not necessary, the DCS Site Reps may then commit the plans for DCS services by using a "Commit" action button.

Requests are Made for Services

First, customer representative creates a request for service for a specific client (person) by creating a Service Request document. Then the delivery team rep either approves or rejects the request for service (using an action button). If the request is approved, then Service Request Activity documents are created by the application based on the activities in the "work flow" (i.e., the activities necessary to complete a service). There is one document for each activity that must be performed. For example, a service request for "Notes Deploy" could have five service request activities: "Schedule the client," "Kit the hardware," "load the image," "Deploy to client," and "Close."

Service Request Activities are Performed

In this implementation someone on the delivery team assigns an owner (using an action button) to an activity. The owner is the name of someone on the delivery team that will perform the specific activity. When an owner is assigned to the first activity in the work flow, the status of that activity is automatically set to "In progress." The activity automatically appears in the personal "to-do" view of the person that was assigned as the owner. The assigned owner performs the actual work for any activities that have a status of "In progress." If additional move, add, or change activities are required for the request, the delivery team can add "MAC" activities to the request in-progress by using an action button.

For certain predefined activities, the owner will collect and update deployment details (serial numbers, license info, etc.) from and to the site's Asset Management database. Once an activity has been "worked," the owner enters any "additional information" required for that activity on the Service Request Activity document, and then updates the status of the activity (using an action button) to "Completed," "Exception Review," or "Bypassed." As each activity is completed, the status(es) of the succeeding activity(s) is/are automatically changed to "Pending" if an owner has not yet been assigned, or to "In progress" if an owner has been assigned. When the last activity is completed, the status of the entire service request is changed to "Completed."

Progress is Monitored Using Various Views

Views that may be used to monitor progress include: The annual number of planned services vs. the number of requests that are new, committed, in progress, completed, rejected, or canceled; The number of planned services vs. the number of requests that are new, committed, in progress, completed, rejected, or canceled for each quarter; The detailed committed, in-progress, or completed requests; The status of the requests and their activities; The clients that are currently scheduled or waiting to be scheduled; and The current deployment team workload.

Access to the database is controlled through the database access control list (ACL). The ACL contains group names with "roles" assigned to each group. The names of the people in each group are defined and maintained in the Notes Names and Address Book by their assigned owners.

Documents can be read only by those with the proper authority. Users can only see and read a document if their name or role is listed in the Readers field in the Document Control section of the document. This prevents a customer in one business area from seeing the plans, requests, and activities for another business area, but allows the delivery team managers to see the information for all business areas.

Document creation is restricted by individual forms and by ACL groups. The creator of a document is automatically the document "author." The document author can add additional authors and readers to a document. Only the document authors can edit the document.

The SRM has the following user roles: Admin (Application Coordinator/Administrator); Representative for the delivery team; BAR (Customer Rep); BATR (Business Area Technical Rep); Delivery; Asset Management (AM); and DCSMgr (Distributed Computing Services manager). The Admin can edit and view all documents, change the status of any document, create keyword documents, create help documents, and do anything that the SiteRep role can do. The SiteRep can define services, activities, and workflows, create plans and requests, commit a Service Plan, Approve/Reject a Service Request, and do anything that the Delivery role can do. The BAR can create plans and requests, and edit and view only the plans or requests for which the user is the BAR. The BATR can create plans and requests, and edit and view only the plans or requests for which the user is the BATR. The Delivery can create plans and requests, assign an owner to an activity, Complete/Bypass an activity, place an activity in exception status, and add a MAC activity to a request in progress. The AM can see the buttons on the Service Request Activity to retrieve and update data from and to the Asset Management database. (The buttons only work if the user also has the proper access levels to the Asset Management database.) The DCSMgr can read all documents.

Figure 7:
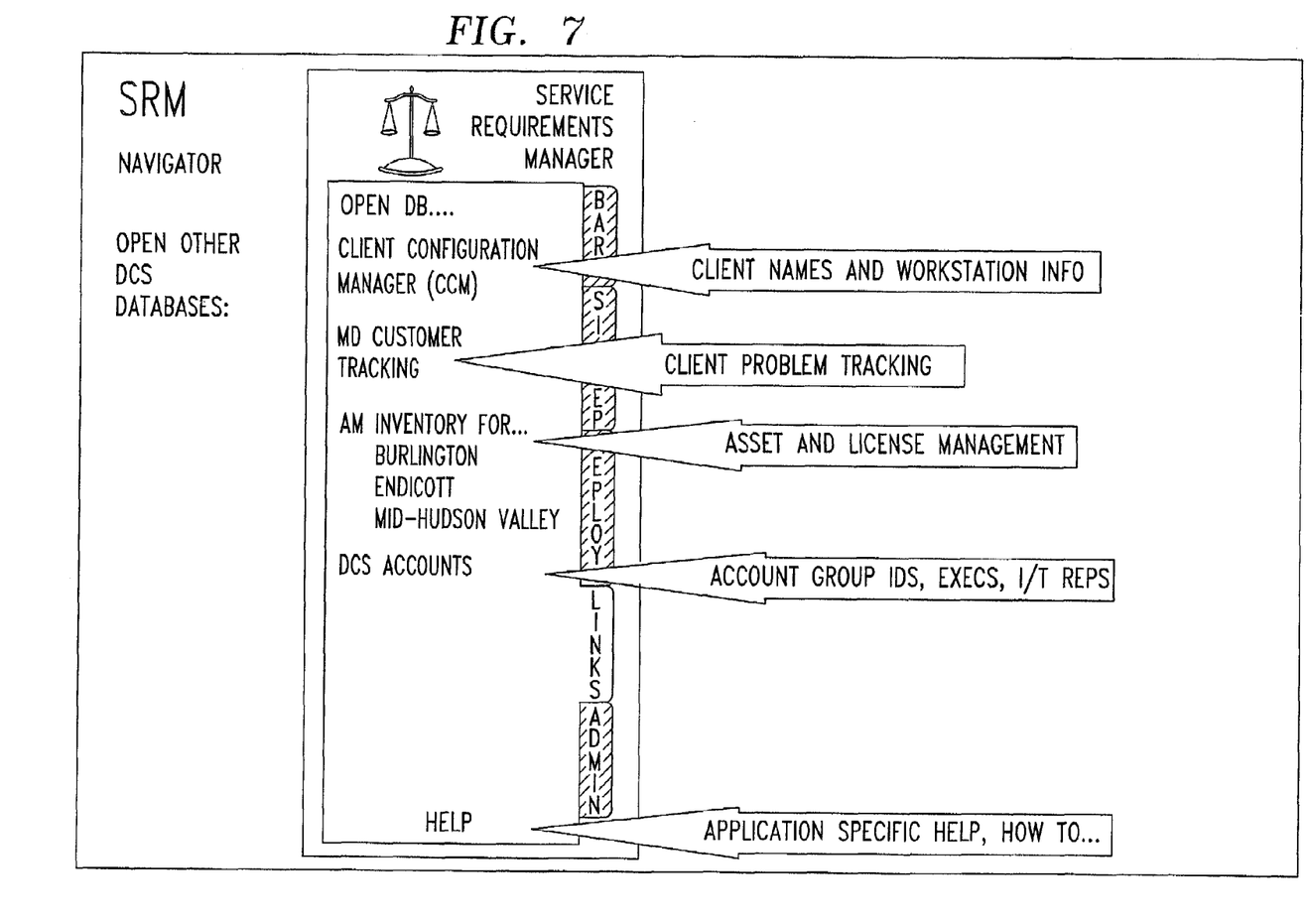
FIGS. 7-11 show views that may be presented during the course of the invention.
Figure 8:
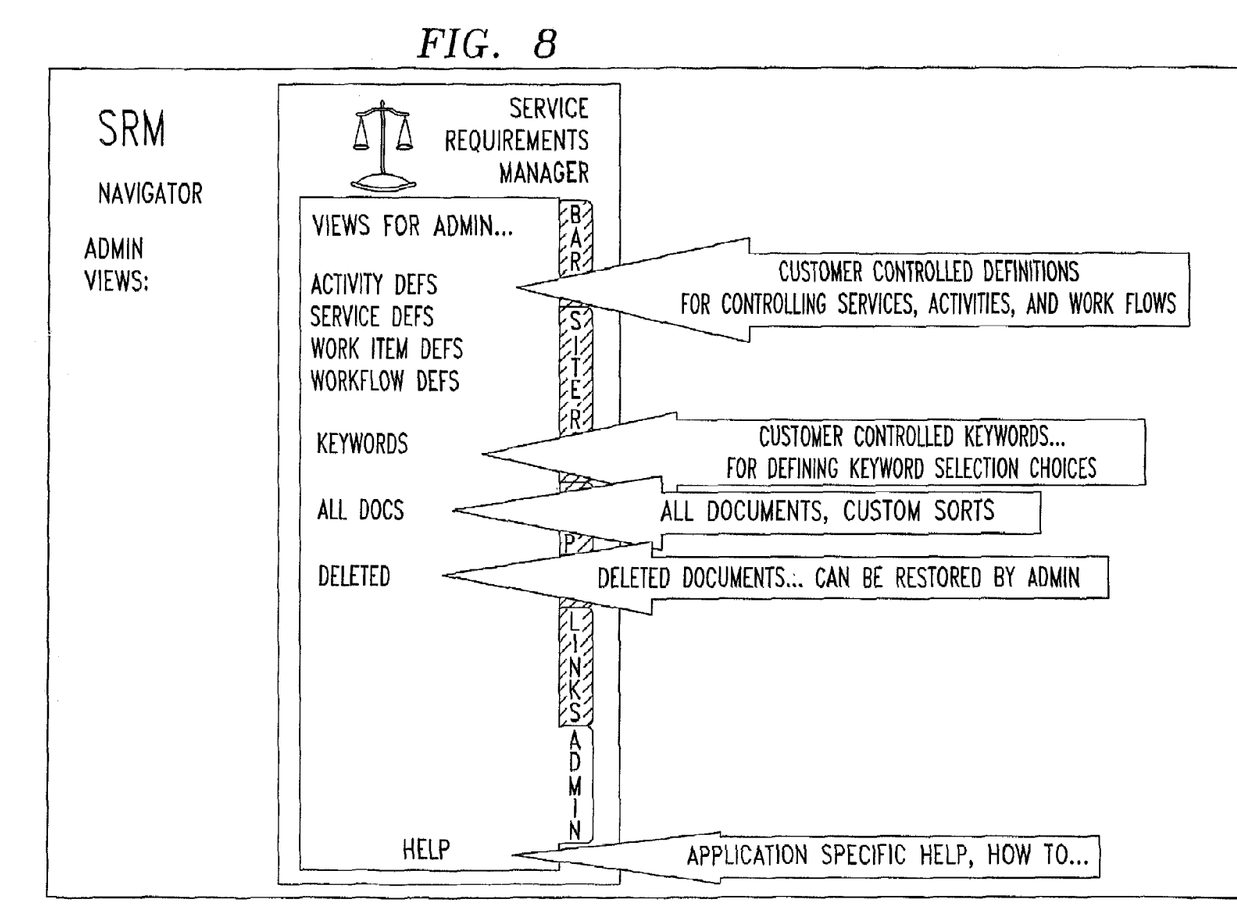
Figure 9:
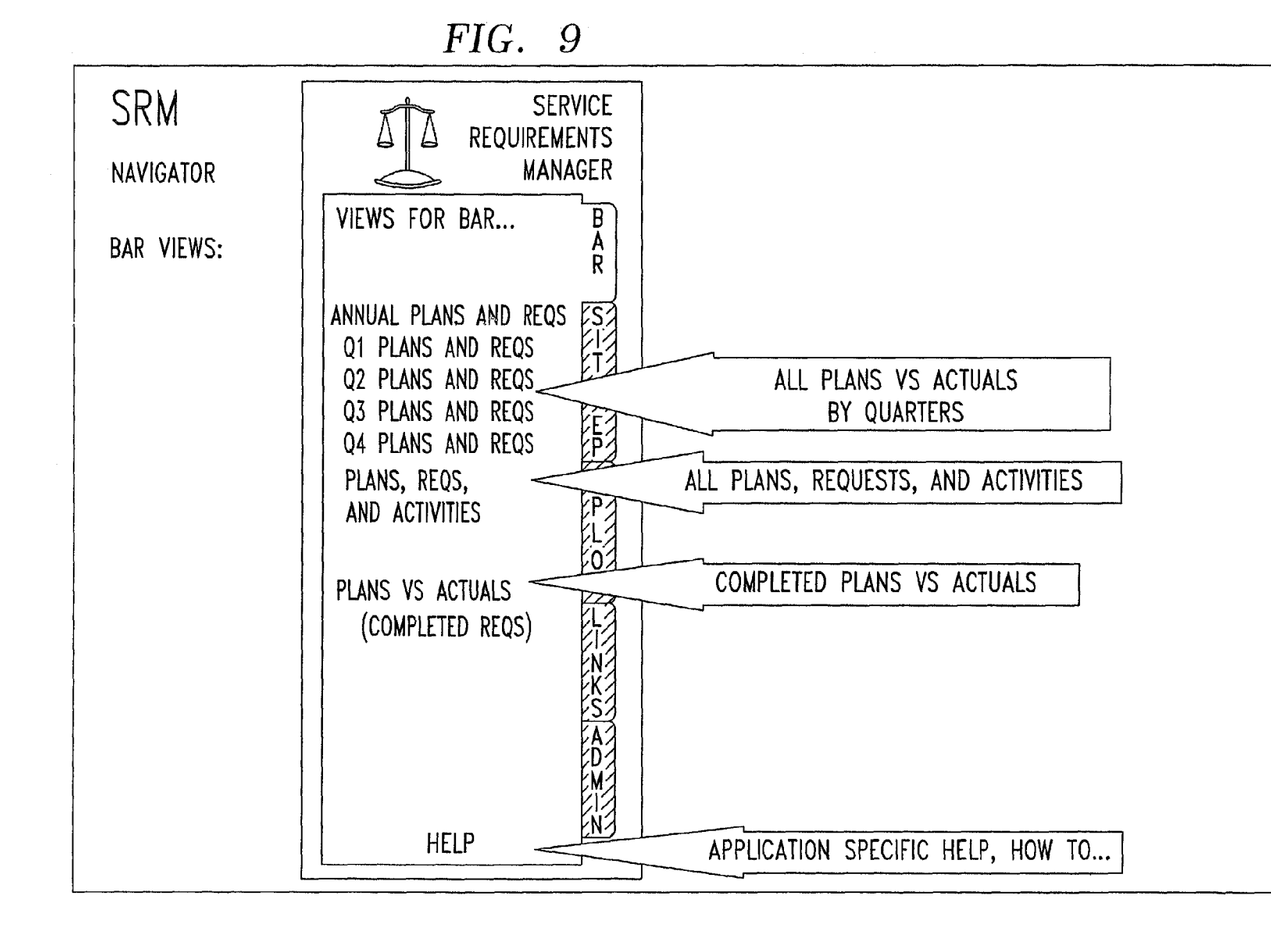
Figure 10:
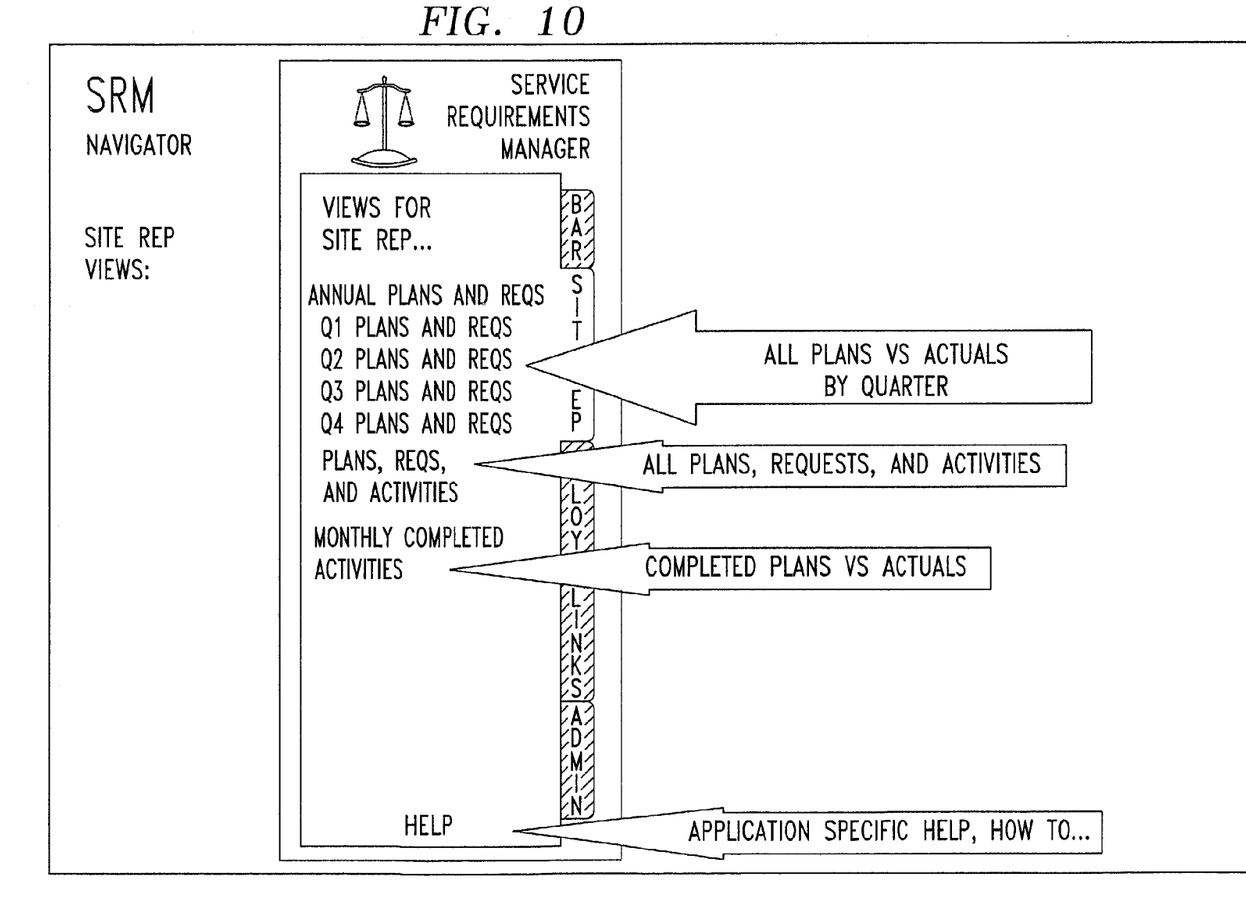
Figure 11:
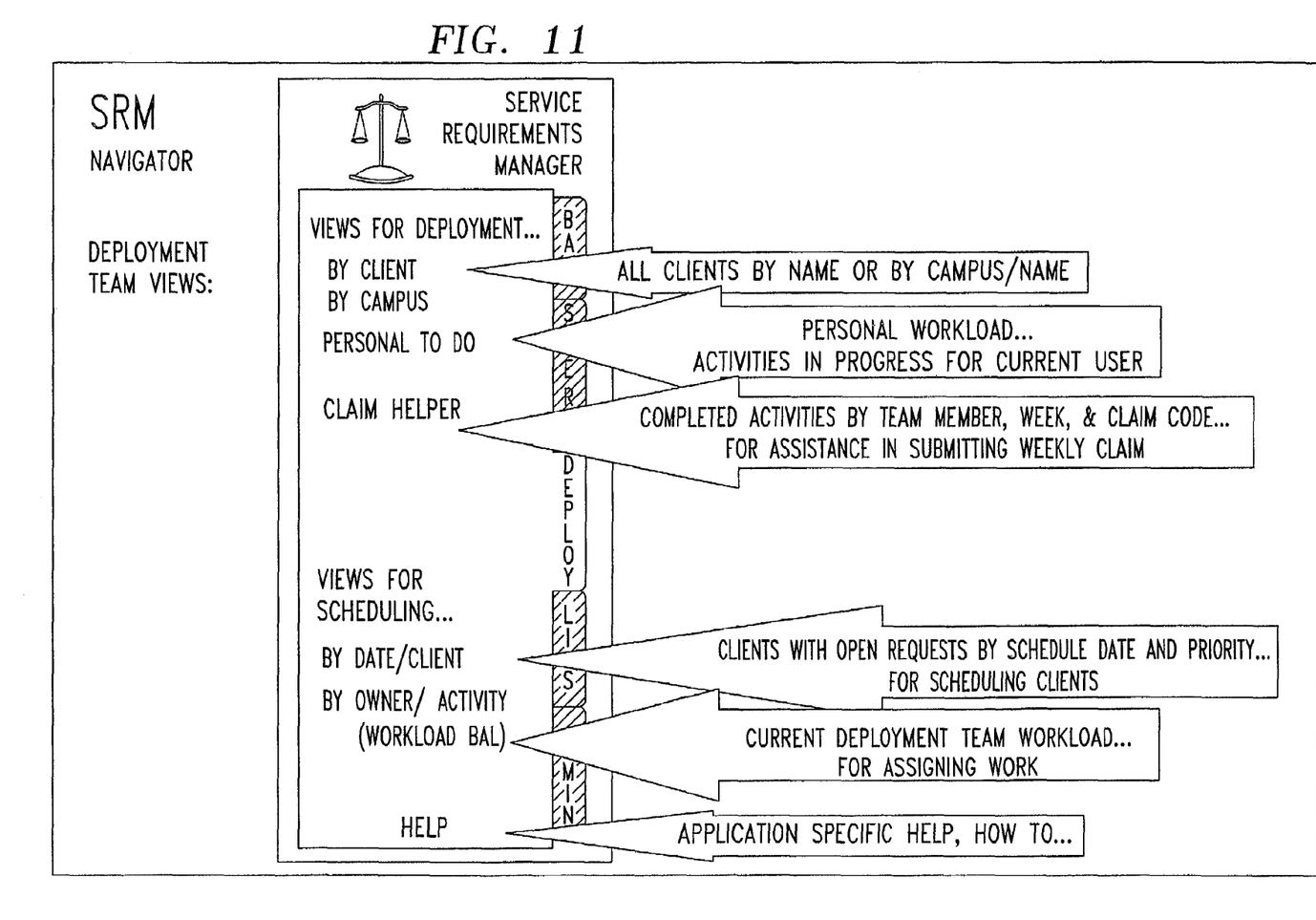

FIGS. 8-10 show a sample of the views accessible to the different user groups. FIG. 7 illustrates a user interface that may be provided to help navigate to other associated databases available to the different users.

This implementation of SRM is a lotus Notes Database that uses "forms" to create "documents." These forms are discussed below.

Activity Definition Form

The site reps use this form to define a service activity. These activities are used in the workflow for a Service/Service Type.

DBRule Form

The application programmer uses this form to define the database location information. The information is used to access other databases.

Help Form

The application coordinator uses this form to create application specific help for the users and administrators.

Keyword Form

The application coordinators use this form to setup the values of a "user-defined" keyword. The keywords are used for field selection choices.

Reporting Calendar Form

The application coordinator uses this form to define the dates that are used for reporting cutoffs. The dates are used to categorize completed requests and activities in a view.

Service Definition Form

The site reps use this form to define the information about a specific Service/Service Type. This includes the campus where offered, is it billable?, a description, etc.

Workflow Definition Form

The site reps use this form to define an activity as an ordered step in the work flow for a specific Service/Service Type. It includes the sequence number in the workflow, name, description, predecessor activities, successor activities, etc.

Work Item Definition Form

The site reps use this form to define a work item that is used for billing for a specific campus. When a Service Plan is created, work items are selected from the list of defined work items for the campus.

Service Plan Form

The site reps use this form to record the annual plan for a Service/Service Type.

Service Request Form

The customer reps and the technical reps use this form to request a service for a specific employee (client). This includes which quarter the request is needed, the priority, the employee name, id, div, phone, platform, etc.

Service Request Activity Form

These documents are created automatically when a Service Request is approved. A work activity is for a specific Service Request. It includes the activity code, sequence number, predecessors, successors, owner, etc. The delivery team uses this form to assign ownership, track an activity, and collect deployment details.

The SRM database includes several views grouped by user role or task. These views include a Help View, BAR Views, SiteRep Views, Deployment Views, Scheduling Views, Definition Views, Admin Views, and Personal Views.

The Help View shows all application specific help documents. The BAR (customer) Views show Annual Plans and Requests; Quarterly Plans and Requests (one view for each quarter); Plans, Requests and Activities; and Plans vs. Completed Requests. The SiteRep Views show Annual Plans and Requests; Quarterly Plans and Requests (one view for each quarter); Plans, Requests, and Activities; and Completed Activities by Month. The Deployment Views show all Requests and Activities by Client; All Requests and Activities by Campus, BAR, Client; and Completed Activities.

The Scheduling Views show Active Requests and Activities by Date, Client; and Active Requests and Activities by Owner, Activity (for workload balancing). The Definition Views show Activities; Services; Work Items; and Work Flow Activities. The Admin Views show All documents; DB Rules; Deleted documents; Keywords; Calendar; and Any other special views for admin support. The Personal Views show personal "To Do" for an Activity Owner.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

The invention claimed is:

1. A method of generating a plurality of concurrent solutions for a corresponding plurality of service requests, each of the service requests having one or more service types, said method comprising the steps of:

providing a fully configurable application for managing a set of base processes and functions;

approving the service requests;

using said configurable application and a single user interface to define a set of service types and to define a sequence of activities for each of said service types;

for each service request, after the request is approved, configuring a workflow comprised of activities from said defined sequences of activities to generate a solution for said each service request, whereby the plurality of concurrent solutions for the plurality of service requests are generated;

defining owners of said activities in each said workflow and a schedule for performing said activities whereby said owner and schedule are defined using load balancing;

performing said activities and monitoring completion of said activities and said load balancing;

assigning to each activity one of a group of defined statuses, said defined statutes including in progress and pending;

in each workflow, as each activity in the workflow is completed, changing the status of each succeeding activity in the workflow to in progress if an owner has been assigned to said each succeeding activity, or to pending if no owner has yet been assigned to said each succeeding activity;

using a series of forms and views to manage and to monitor the activities and the workflows;

wherein said forms include:

i) an Activity Definition form to define the activities;
ii) a DBRule form to define database location information and for accessing databases;
iii) a Help form to create application specific help for users and administrators;
iv) a Keyword form to setup the values of user-defined keywords;
v) a Reporting Calendar form to define dates that are used for reporting cutoffs;
vi) a Service Definition form to define information about specific service types;
vii) a Workflow Definition form to define the activities as ordered steps in the workflows;
ix) a Services Plan forms to record annual plans for the service types;
x) a Service Request form for requesting services for specific clients; and
xi) a Service Request Activity form identifying, for each activity, an activity code, a sequence number, predecessor activities, successor activities, and owners;

wherein said views include:

i) a Help view showing application specific help documents;
ii) BAR views showing annual plans and request, quarterly plans and requests, and plans vs. completed requests;
iii) a SiteRep view showing annual plans and requests, and completed activities by month;
iv) a Deployment view showing all requests and activities by client, campus, BAR and client, and completed activities;
v) Scheduling views showing active requests and activities by date, client and owner;
vi) Definition views showing activities, services, work items and workflow activities;
vii) Admin views showing all documents, database rules, deleted documents, keywords and calendars; and
viii) Personal views showing activities to be performed by owners;

when each service request is approved, creating the service request activity form for said each service request; and using the service request activity form for each service request to assign ownership, track activities and collect deployment details for said each service request.

2. A method according to claim 1, comprising the further step of, when the last activity in one of the workflows is completing, changing the status of the service request, for which said one of the workflows was configured, to completed.

3. A method according to claim 2, comprising the further steps of:

making one of said user requests, including the steps of:
 i) a customer representative creating a request for service for a specific client by creating the Service Request form;
 ii) a delivery team representative approving the request for service; and
 iii) then creating the Service Request Activity form based on the activities necessary to complete the service;

a person on the delivery team assigning owners to the activities;

for certain predefined activities, the owners of the activities collecting and updating deployment details from and to a site's Asset Management database; and once an activity has been worked, the owner of the activity entering additional information required for that activity on the Service Request Activity form, and updating the status of the activity to one of (i) completed; (ii) exception review; and (iii) completed.

* * * * *